US012667154B2

(12) United States Patent
Kwak et al.

(10) Patent No.: US 12,667,154 B2
(45) Date of Patent: Jun. 30, 2026

(54) DEVICE FOR PROTECTING USER'S HEAD, AIRBAG FOR THE SAME, AND METHOD OF MANUFACTURING THE AIRBAG

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Dae Young Kwak, Hwaseong-si (KR); Mun Seok Jeong, Hwaseong-si (KR); Jang Mook Lim, Hwaseong-si (KR); Tae Hyeong Kim, Yongin-si (KR); Garam Jeong, Yongin-si (KR); Seok Hoon Ko, Yongin-si (KR); Dae Chang Jung, Hwaseong-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/971,667

(22) Filed: Dec. 6, 2024

(65) Prior Publication Data

US 2025/0344795 A1      Nov. 13, 2025

(30) Foreign Application Priority Data

May 10, 2024      (KR) ........................ 10-2024-0061845

(51) Int. Cl.
A42B 3/04          (2006.01)
A42B 3/00          (2006.01)
A42B 3/20          (2006.01)
A42B 3/32          (2006.01)
B62J 6/026          (2020.01)
B62J 9/21          (2020.01)
B62K 3/00          (2006.01)

(52) U.S. Cl.
CPC ............ *A42B 3/0486* (2013.01); *A42B 3/006* (2013.01); *A42B 3/0473* (2013.01); *A42B 3/205* (2013.01); *A42B 3/322* (2013.01); *B62J 6/026* (2020.02); *B62J 9/21* (2020.02); *B62K 3/002* (2013.01); *B62K 2202/00* (2013.01)

(58) Field of Classification Search
CPC ................................ A42B 3/06; A42B 3/0486
See application file for complete search history.

(56) References Cited

U.S. PATENT DOCUMENTS

| | | | |
|---|---|---|---|
| 11,064,753 B2 * | 7/2021 | Segal | .................... A42B 3/0486 |
| 11,510,450 B2 * | 11/2022 | Wendelrup | ............... A42B 3/00 |
| 2019/0125025 A1 * | 5/2019 | Williams | ............... A42B 3/066 |

* cited by examiner

*Primary Examiner* — Katherine M Moran
(74) *Attorney, Agent, or Firm* — MCDONNELL BOEHNEN HULBERT & BERGHOFF LLP

(57)          ABSTRACT

A head protection device includes an airbag receiving case flexibly bent along a user's neck to allow both ends to be releasably fastened, an airbag folded and stored in the airbag receiving case, and an inflator part which includes a battery and supplies inflated gas to the airbag. The airbag includes an occipital part which protects a back part of the user's head, a front/upper head part which protects a front part and an upper part of the head, a right part which protects a right area of the head, and a left part which e protects a left area of the head.

18 Claims, 9 Drawing Sheets

262e, 264c

A 263a, 264a 262c, 263b, 264b

DEVICE FOR PROTECTING USER'S HEAD, AIRBAG FOR THE SAME, AND METHOD OF MANUFACTURING THE AIRBAG

CROSS REFERENCE TO RELATED APPLICATIONS

The present application claims priority to Korean Patent Application No. 10-2024-0061845, filed on May 10, 2024, the entire contents of which is incorporated herein for all purposes by this reference.

TECHNICAL FIELD

The present disclosure relates to a head protection device, an airbag for head protection, and a method of manufacturing the airbag.

BACKGROUND

Recently, the use of smart mobility devices for first mile or last mile has been active.

An example of smart mobility device is an electric kickboards, and recently, sharing services for electric kickboards have been expanding.

As the use of electric kickboards increases, safety accidents are increasing accordingly, and for this reason, the need for and demand for safety devices is increasing.

In general, bicycle helmets are used as safety devices, but many users are hesitant to use them due to inconveniences such as hair becoming matted.

Accordingly, there is a demand for safety devices that can be used without such inconvenience, and as part of this, research on personal airbags is in progress.

SUMMARY

Various aspects of the present disclosure are directed to providing a personal protection device in the form of an airbag.

Various aspects of the present disclosure are directed to providing a head protection device that can be deployed when an accident occurs in a folded and stored state to protect the user's head.

Various aspects of the present disclosure are directed to providing a personal protection device that can be stored in a protective device kit provided on an electric kickboard and can communicate wirelessly with the kit when worn.

Various aspects of the present disclosure are directed to providing an airbag that can be used in such a protective device, and a method of manufacturing the same.

According to an embodiment of the present disclosure, there is provided a head protection device including an airbag receiving case configured to be flexibly bent around a user's neck and including both ends configured to be releasably fastened to each other, an airbag which is folded and stored in the airbag receiving case, and an inflator part including a battery and configured to supply inflated gas to the airbag.

Here, the airbag may include an occipital part configured to protect a back part of a head of the user when inflated, the occipital part including an inlet through which the inflated gas flows in, a front/upper head part configured to protect a front part and an upper part of the head, the front/upper head part extending from and being in flow communication with the occipital part and including an upper right edge and an upper left edge, a right part configured to protect a right area of the head, the right part extending from and being in flow communication with the occipital part and including a first right edge and a second right edge, which are connected to the upper right edge, and a left part configured to protect a left area of the head, the left part extending from and being in communication with the occipital part and including a first left edge connected to the upper left edge and a second left edge connected to the second right edge.

Here, the occipital part may include an upper occipital part corresponding to the back part of the head, and a cervical part extending from the upper occipital part to protect a cervical spine of the user.

Here, the front/upper head part may include an upper head part extending from and being in flow communication with the occipital part, and a front part extending from and being in flow communication with the upper head part.

Here, the right part may include a third right edge and the left part includes a third left edge, and the front part may include a front edge connected to both of the third right edge and the third left edge.

Here, the airbag may further include a right jaw line part extending diagonally from and in flow communication with the occipital part, and a left jaw line part extending diagonally from and in flow communication with the occipital part.

Here, the right jaw line part may include a right fixing edge fixedly connected to a right inner end of the airbag receiving case, and wherein the left jaw line part includes a left fixing edge fixedly connected to a left inner end of the airbag receiving case.

Here, the airbag receiving case may include a left fastening part which is connected to the inflator part at the center and includes a right fastening part located at a right end and a left fastening part located at a left end and releasably fastened to the right fastening part.

Here, the airbag receiving case may include a middle part which is connected to the inflator part, a right fastening part located at a right end of the airbag receiving case, and a left fastening part located at a left end of the airbag receiving case, the right fastening part and the left fastening part releasably fastened to each other.

The airbag receiving case may comprise a main cover which is connected to the inflator part, provides a storage space to store the airbag in a folded state, and includes a right fastening part and the left fastening part, and a design cover which detachably surrounds the main cover.

Here, the inflator part may further include a housing which is connected to the airbag receiving case and provides a storage space therein, an inflator which is located within the housing and includes a discharge pipe that discharges the gas into the airbag, and a control circuit unit which controls operation of the inflator.

Here, the housing may include an outer housing which includes an upper outer housing connected to the airbag receiving case, and a lower outer housing detachably coupled to the upper outer housing; and an inner housing which is coupled to the upper outer housing or the lower outer housing, and accommodates the inflator, the control circuit unit, and the battery.

Here, the head protection device may further include a fixing means which tightens an outer surface of the inlet to be fixed at the discharge pipe while the discharge pipe is inserted into the inlet of the airbag.

Here, the inflator part may include a light.

Here, the inflator part may further include a wireless communication module, the airbag receiving case may include a direction indication lighting unit for direction indication of travel, and the control circuit unit may control the direction indication lighting unit according to a signal received through the wireless communication module.

According to an embodiment of the present disclosure, there is provided an airbag for head protection, including an occipital part configured to protect a back part of a head of the user when inflated, the occipital part including an inlet through which the inflated gas flows in, a front/upper head part configured to protect a front part and an upper part of the head, the front/upper head part extending from and being in flow communication with the occipital part and including an upper right edge and an upper left edge, a right part configured to protect a right area of the head, the right part extending from and being in flow communication with the occipital part and including a first right edge and a second right edge, which are connected to the upper right edge, and a left part configured to protect a left area of the head, the left part extending from and being in communication with the occipital part and including a first left edge connected to the upper left edge and a second left edge connected to the second right edge.

Here, the front/upper head part may include an upper head part extending from and being in flow communication with the occipital part, and a front part extending from and being in flow communication with the upper head part.

Here, the right part may include a third right edge, the left part may include a third left edge, and the front part may include a front edge connected to both of the third right edge and the third left edge.

Here, the airbag may further include a right jaw line part extending diagonally from and in flow communication with the occipital part, and a left jaw line part extending diagonally from and in flow communication with the occipital part.

Here, the right jaw line part may include a right fixing edge fixedly connected to a right inner end of the airbag receiving case, and the left jaw line part may include a left fixing edge fixedly connected to a left inner end of the airbag receiving case.

According to an embodiment of the present disclosure, there is provided a method of manufacturing an airbag for head protection, including making a primary cushioning material using airbag fabrics, the primary cushioning material including an occipital part configured to protect a back part of a head of the user when inflated, the occipital part including an inlet through which the inflated gas flows in, a front/upper head part configured to protect a front part and an upper part of the head, the front/upper head part extending from and being in flow communication with the occipital part and including an upper right edge and an upper left edge, a right part configured to protect a right area of the head, the right part extending from and being in flow communication with the occipital part and including a first right edge and a second right edge, which are connected to the upper right edge, and a left part configured to protect a left area of the head, the left part extending from and being in communication with the occipital part and including a first left edge connected to the upper left edge and a second left edge connected to the second right edge, connecting an upper right edge of the front/upper head part with a first right edge of the right part, connecting an upper left edge of the front/upper head part with a first left edge of the left part, and connecting a second right edge of the right part with a second left edge of the left part.

According to an embodiment of the present disclosure, it is possible to obtain a head protection device that can be deployed in a folded and stored state when an accident occurs to protect the user's head.

In addition, according to an embodiment of the present disclosure, it is possible to obtain a personal protection device that can be stored in a storage kit provided on a kickboard and can communicate wirelessly with the kit when worn.

According to an embodiment of the present disclosure, an airbag has advantages that sewing is simple and the inflation portion does not overlap.

DETAILED DESCRIPTION

Figure 1:
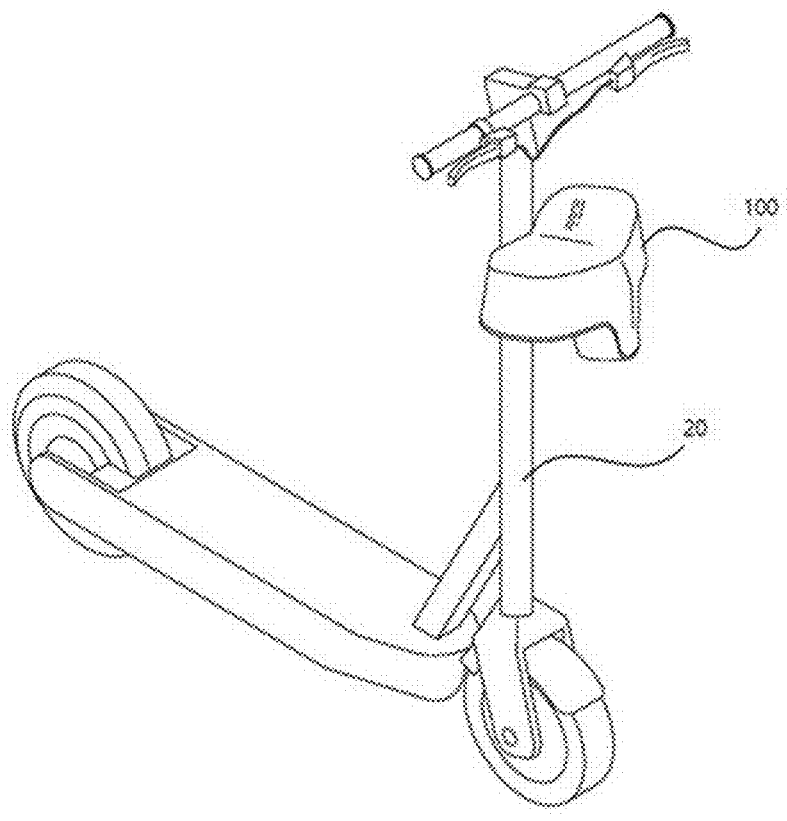
FIG. 1 is an exemplary diagram of an electric kickboard to which a kit, in which a personal protection device according to the present disclosure may be stored, is applied.

Since various modifications may be applied to the present disclosure and there may be various embodiments, specific embodiments will be illustrated in the drawings and described in the present disclosure. However, this is not intended to limit the present disclosure to specific embodiments and should be understood to include all changes, equivalents or substitutes included in the spirit and technical scope of the present disclosure.

Suffixes "module" and "part" used herein are only used for the name distinction between components, and should not be interpreted as having a premise of physicochemical classification or separation.

Terms including ordinal numbers such as "first" and "second" may be used to explain various components, but the components are not limited by the terms. The terms may be used only in a name for distinguishing one component from another component, and the sequence between them is recognized by the context of the description, not by the names.

The term "and/or" is used to include all the cases of any combination of the plural items that are subject to the target. For example, "A and/or B" means all three cases of "A", "B", "A and B".

When a component is referred to as "connected" or "linked" to another component, it may be directly connected to or linked to that another component, but it should also be understood that there may be further another component therebetween.

The terms used in the present disclosure are used to explain a particular embodiment, and are not intended to limit the present disclosure. A singular term in the present disclosure includes a plural term unless it is contextually, clearly means a singular form. In the present disclosure, the terms such as "include" or "have" are to specify that there are features, numbers, steps, operations, components or parts described in the present disclosure, or combinations thereof, and It should be understood that the presence or the possibility of addition of numbers, steps, operations, components, part, or combinations thereof are not excluded in advance.

Unless defined differently, all the terms used here, including technical or scientific terms, have the same meaning as commonly understood by those who have normal knowledge in the technical field to which the present disclosure belongs. Terms such as what are commonly used in the dictionary should be interpreted as having the meaning of the context of the relevant technology, and are not interpreted as an ideal or excessively formal meaning unless defined clearly in the present disclosure.

FIG. 1 illustrates a kickboard as an example of a personal mobility device. As shown in FIG. 1, the kickboard includes a storage kit 100 on a steering axis 20. A personal protection device according to an embodiment described later may be stored in the storage kit 100.

When the kickboard in FIG. 1 is subject to a sharing service, the cover of the storage kit 100 is locked, and the lock may also be released as user authentication for the sharing service of the kickboard is completed, and the state of the sharing service is converted to a usable state.

The storage space of the storage kit 100 may include an infrared sterilization device for sterilizing the protection device 200, a wired or wireless battery 256 charging device for a mobile phone or the protection device 200, a wireless communication module for communication with an external server, and a wireless short-range communication module for short-range communication with the protection device 200.

Figure 2A:
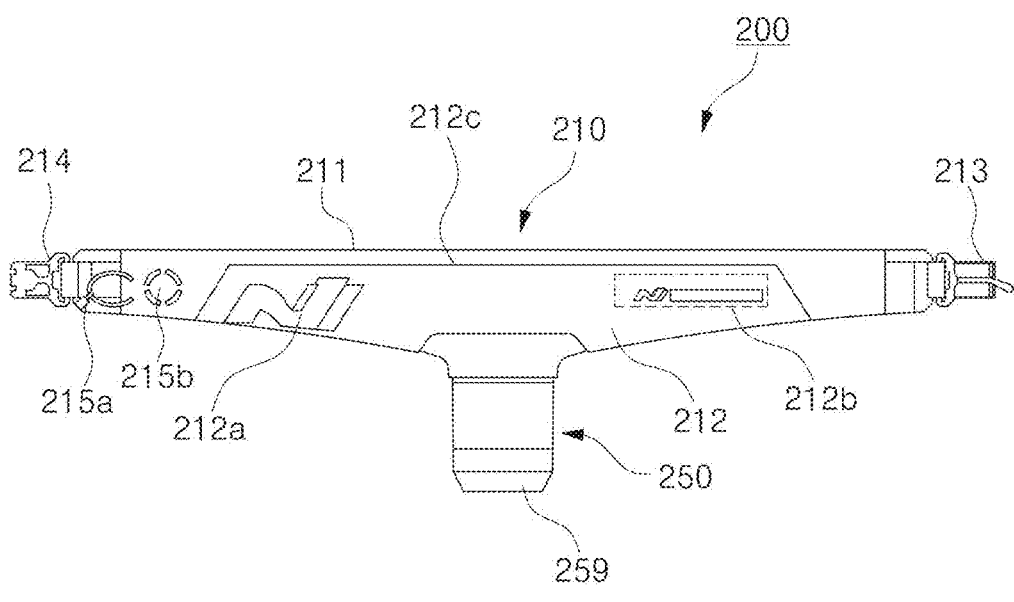
FIG. 2A and FIG. 2B illustrate a protection device according to an embodiment of the present disclosure.
Figure 2B:
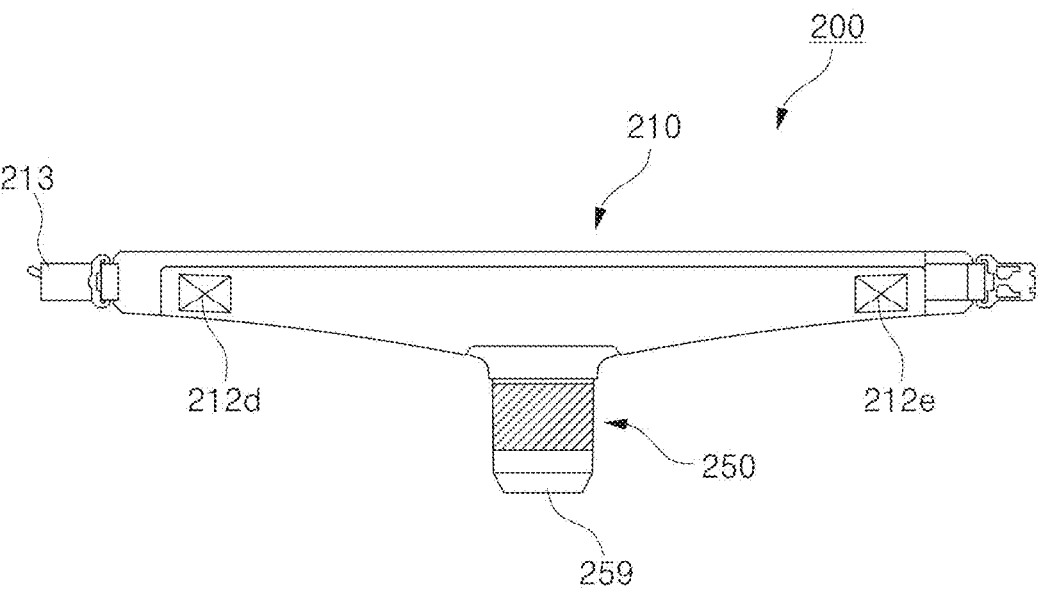
Figure 3:
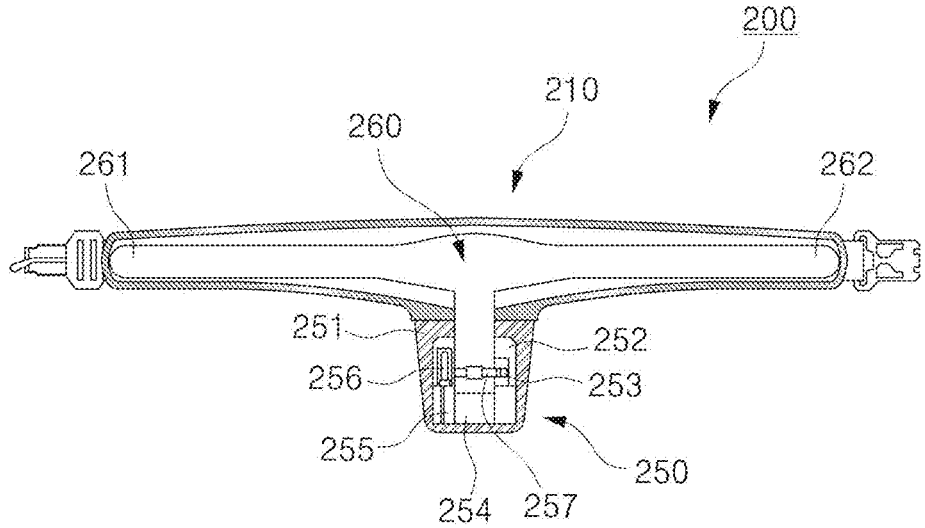
FIG. 3 is a conceptual diagram illustrating the internal structure of a protection device according to an embodiment of the present disclosure.

FIGS. 2 and 3 show rear and front views of the protection device 200 according to an embodiment of the present disclosure.

The protection device 200 includes an airbag receiving case 210 and an inflator part 250, and The protection device 200 may be worn by bending both ends of the airbag receiving case 210 around the neck and fastening the ends together in front of the neck while the inflator part 250 is positioned at the back of the neck.

The rear view in FIG. 2A and FIG. 2B are a view from behind with the inflator part 250 positioned behind the neck when worn, and the front view in FIG. 3 shows the side wrapped around the neck.

Hereinafter, for convenience of explanation, the front, rear, right, and left are based on the user when the protection device 200 is worn. That is, in in FIG. 2A and FIG. 2B, the direction entering the ground is set to the front, and the direction coming out of the ground is set to the rear.

The airbag storage unit 210 may include a main cover 211 that provides a storage space so that the airbag 260 may be folded and stored, and a design cover 212 that is detachably attached to the outer surface of the main cover 211.

The main cover 211 includes a right fastening part 213 at its right end and a left fastening part 214 at its left end.

The right fastening part 213 and the left fastening part 214 may be separably fastened to each other.

The fastening structure of the right fastening part 213 and the left fastening part 214 may be a buckle used in a helmet or hat, etc.

The main cover 211 is made of a flexible material so that it may be flexibly bent along the circumference of the user's neck and its length may be adjusted as described later. For example, the material may be fabric, rubber, or flexible synthetic resin. However, the embodiment is not limited to these examples.

In addition, the center of the upper surface of the main cover 211 may include a discharge line extending longitudinally in a portion that is thinner than the surrounding area so that the airbag 260 may be discharged when deployed.

The main cover 211 may be adjustable in length, and for this purpose, the main cover 211 may include a length adjustment strap 215a, and a fixture 215b that secures the length adjustment strap 215a in a pulled state. The length adjustment strap 215a is buried surrounding the storage space of the main cover 211 and a portion of the length adjustment strap 215a is exposed. When the exposed portion is pulled out further, the main cover 211 is wrinkled and its length is reduced. At this time, if the length adjustment strap 215a is fixed in the exposed state using the fixture 215b, the overall length of the main cover 211 is maintained in a shortened state. This scheme is used to adjust the circumference length of the waist band of training pants, and is well known, so further explanation will be omitted.

The design cover 212 may be detachably attached to the outer surface of the main cover 211.

To this end, the design cover 212 may include a zipper 212c at the top in in FIG. 2A and FIG. 2B. The design cover 212 is attached to the opposite side of the main cover 211 using hook and loop fasteners such as Velcro® 212d and 212e by turning the other end of the design cover 212 downward while being attached to the main cover 211 by a zipper 212c.

Referring to in FIG. 2A and FIG. 2B, logos 212a and 212b or certain marks may be printed on the design cover 212.

To enhance nighttime visibility of the logos 212a and 212b, a printed electroluminescent device using conductive polymer ink may be used. When power is supplied from the battery 256 of the inflator part 250, which will be described later, the logos 212a and 212b emit light. To this end, the design cover 212 may include a power connection line.

FIG. 3 is a conceptual diagram showing the internal structure of the protection device 200, and hereinafter, the inflator part 250 will be described in detail below with reference to FIG. 3.

The inflator part 250 includes a housing, an inflator 254, a control circuit unit 253, and a battery 256.

The housing may include an outer housing 251 connected to the main cover 211, and an inner housing 252 located within the outer housing 251.

Figure 4:
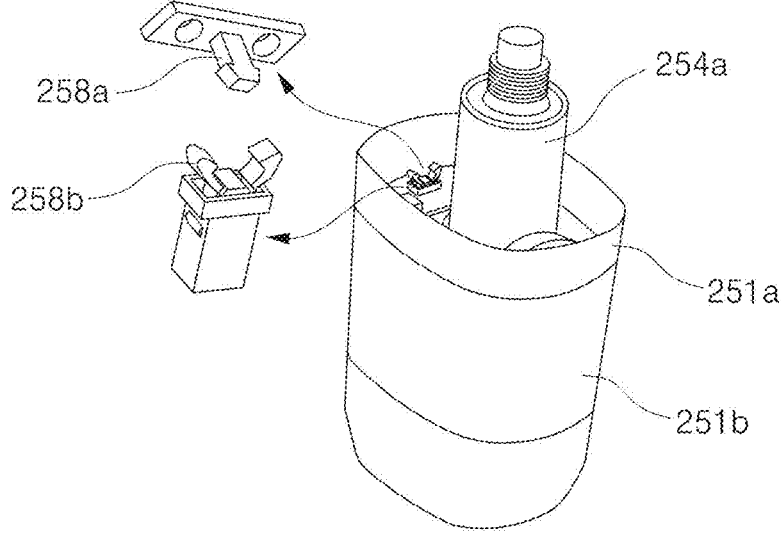
FIG. 4 illustrates an inflator part according to an embodiment of the present disclosure.

Additionally, the outer housing 251 may be an integral type or may be a separable type as shown in FIG. 4. In the case of the separable type, it is advantageous for maintenance as it allows access to the internal components described later.

Referring to FIG. 4, the outer housing 251 includes an upper outer housing 251a connected to the main cover 211 through sewing or bonding, and a lower outer housing 251b detachably coupled to the upper outer housing 251a.

The upper outer housing 251a and the lower outer housing 251b include a coupling structure in such a manner that they may be separated from both sides. The coupling structure may illustratively include a well-known push-push latch.

The push-push latch is a well-known latch, also called a DC latch, and includes a gripper 258b and a hooking rod 258a.

In the present embodiment, the gripper 258b is installed in the lower outer housing 251b, and the hooking rod 258a is installed in the upper outer housing 251a, but the embodiment is not necessarily limited to this example.

As the hooking rod 258a is inserted while pressing the center of the gripper 258b, a gripping movement of the gripper 258b is induced and the hooking rod 258a is gripped. In this state, when the hooking rod 258a is pressed again, the hooking rod 258a is inserted and causes the gripping of the gripper 258b to be released, thereby causing the hooking rod 258a to be released from the gripping. The push-push latch is well known, so further detailed description is omitted.

The inner housing 252 is coupled to the upper outer housing 251a or the lower outer housing 251b, and provides a space in which the inflator 254, the control circuit unit 253, and the battery 256 are accommodated.

The inflator 254 contains chemicals therein, and instantly turns the chemicals into gas under the control of the control circuit unit 253 and supplies the expanded gas to the airbag 260.

For the operation of the inflator 254, a sensor for detecting an accident event may be included, and the sensor may be included in the protection device 200 or in the storage kit 100.

In the case that the storage kit 100 is equipped with an accident detection sensor, if an accident occurs, a predetermined signal may be transmitted from the storage kit 100 to the control circuit unit 253 through wireless communication, and the control circuit unit 253 may operate the inflator 254 according to reception of the signal.

As shown in FIG. 4, the inflator 254 may include a discharge pipe 254a connected to the inlet 261c of the airbag 260, which will be described later.

The control circuit unit 253 controls the overall function of the protection device 200 and may, for example, include a processor mounted on a printed circuit board.

The processor may include a semiconductor integrated circuit and/or electronic devices that perform at least one or more of comparison, judgment, operation, and decision to achieve a programmed function. For example, the processor may be any one or a combination of a computer, a micro processor, CPU, ASIC, and an electronic circuits (circuitry, logic circuits).

Additionally, the control circuit unit 253 may include a short-range wireless communication module for wireless communication with the storage kit 100.

The battery 256 is connected to supply power to the control circuit unit 253 and is rechargeable.

The battery 256 may be charged in a wired or wireless manner through the storage kit 100.

The inflator part 250 may include a speaker 255, through which the inflator part 250 may be controlled by the control circuit unit 253 to output a warning sound.

Additionally, the inflator part 250 includes a light 259 at the bottom as shown in FIGS. 2A and 2B.

The light 259 receives power from the battery 256 according to the user's switch operation, and emits light.

Figure 5:
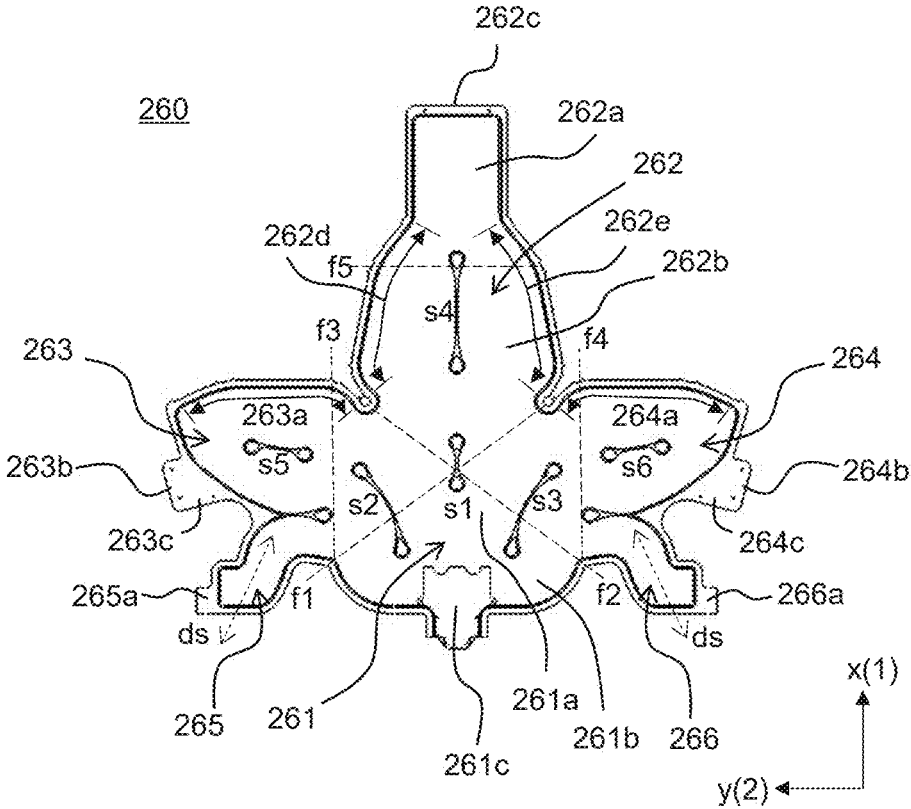
FIG. 5 illustrates a primary cushioning material in an airbag according to an embodiment of the present disclosure.

FIG. 5 shows an airbag 260 according to an embodiment of the present disclosure, which will be described in detail below with reference to FIGS. 6, 7, and 8.

First of all, FIG. 5 shows a primary cushioning material before completion in its unfolded state. If an accident occurs, this is the part that touches the human body first, so materials that are harmless and do not cause injury are used.

For example, the airbag 260 fabric may be woven with airbag yarn whose main raw materials are Nylon-66 and PET.

The surface shown in FIG. 5 is the surface in contact with the user's head, that is, the inner surface, and the opposite surface is the outer surface. Therefore, based on the user's wearing, the right direction corresponds to the left in FIG. 5, and the left direction corresponds to the right in FIG. 5.

Referring to FIG. 5, the airbag 260 of the present embodiment includes an occipital part 261, front/upper head parts 262b and 262, a right part 263, a left part 264, a right jaw line part 265, and a left jaw line part 266.

The occipital part 261 protects the back of the user's head and includes an inlet 261c through which expanded gas flows.

The occipital part 261 may include an upper occipital part 261a corresponding to the back of the user's head, and a cervical part 261b extending in a direction opposite to the first direction (x) in FIG. 5 and corresponding to the position of the user's cervical spine.

The front/upper head parts 262b and 262 protect the front part 262a and the upper part of the user's head, communicates with the occipital part 261, and is inflated by receiving gas through the occipital part 261. The front/upper head parts 262b and 262 extend from the occipital part 261 in the first direction (x) and include an upper right edge 262d and an upper left edge 262c.

The front/upper head parts 262b and 262 may include an upper head part 262b that is extended while communicating with the occipital part 261, and a front part 262a that communicates with the upper head part 262b and further extends to protect a front head part.

The right part 263 is a part that protects the right side of the head, communicates with the right side of the occipital part 261, extends in the second direction (y), and includes a first right edge 263a and a second right edge 263b.

The left part 264 is a part that protects the left part of the head, communicates with the left side of the occipital part 261, extends in the direction opposite to the second direction (y), and includes a first left edge 264a and a second left edge 264b.

The right jaw line part 265 and the left jaw line part 266 communicate with the occipital part 261, respectively, and extend in the diagonal direction (ds) to protect the user's right chin and left chin in an expanded state.

The right jaw line part 265 includes a right fixing edge 265a at its end, and the left jaw line part 266 includes a left fixing edge 266a at its end.

The primary cushioning material may be obtained by overlapping multiple airbag 260 fabrics of the same shape as shown in FIG. 5 and sewing or joining the fabrics at the edges.

In addition, a first seam line (s1), a second seam line (s2), and a third seam line (s3) may be formed in the occipital part 261 through sewing, a fourth seam line (s4) may be formed in the front/upper head parts 262b and 262, and a fifth seam line (s5) and a sixth seam line (s6) may be formed on the right part 263 and the left part 264. In this way, the air pockets in each part may be divided.

The primary cushioning material of FIG. 5 is completed into the airbag 260 through the joining process of FIGS. 6 and 7, which will be described in detail below.

Figure 6:
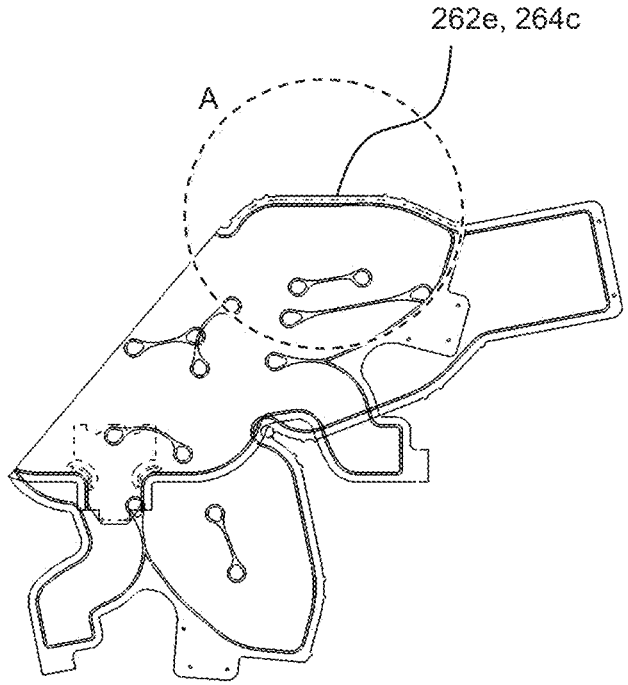
FIG. 6, FIG. 7A, and FIG. 7B show a process of making an airbag cushioning material by connecting edges of the primary cushioning material.

First, when the first cushioning material is folded along a first folding line (f1) in FIG. 5, the upper left edge 262e and the first left edge 264a overlap as shown in A of FIG. 6, and the upper left edge 262e and the first left edge 264a, which are overlapped, are connected by sewing or bonding.

Likewise, when the first cushioning material is folded along the second folding line (f2), the upper right edge 262d and the first right edge 263a overlap, and the upper right edge (262d) and the first right edge 263a, which are overlapped, are connected by sewing or bonding.

Figure 7A:
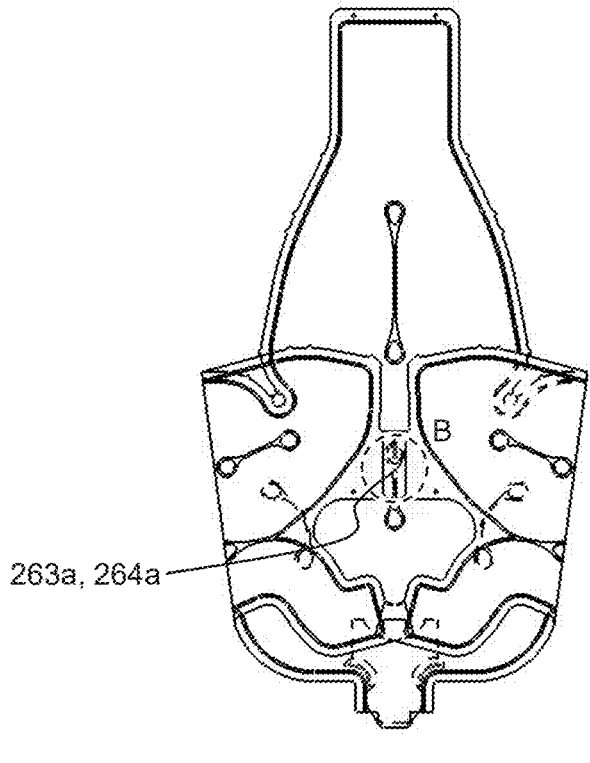

In addition, when the first cushioning material is folded along a third folding line (f3) and a fourth folding line (f4), as shown in FIG. 7A, the second right edge 263b and the second left edge 264b overlap (see part B in FIG. 7A), and in the overlapped state, the second right edge 263b and the second left edge 264b are connected by sewing or bonding.

Figure 7B:
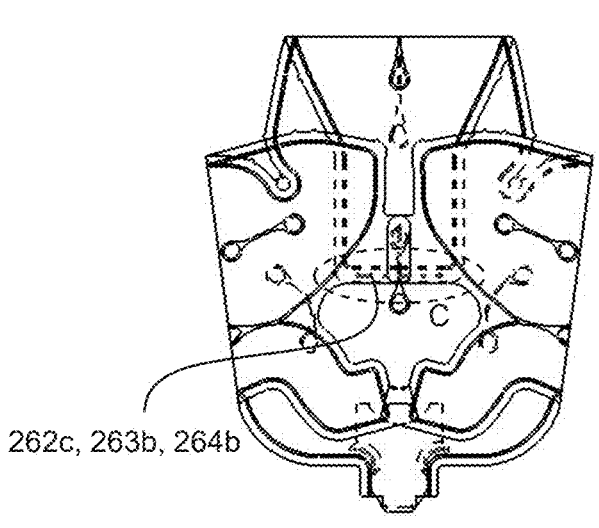

Next, when the first cushioning material is folded along a fifth folding line (f5), as shown in FIG. 7B, the front edge 262c, the third right edge 263c, and the third left edge 264c overlap (see part C in FIG. 7B), and in the overlapped state, the front edge 262c, the third right edge 263c, and the third left edge 264c are connected by sewing or bonding.

The completed airbag 260 is folded and stored in the storage space of the main cover 211. At this time, a hook fixed to the inner right end of the main cover 211 is hooked and connected to a hooking ring formed on the right fixing edge 265a of the right jaw line part 265, and a hook fixed to the inner left end of the main cover 211 is hooked and connected to a hooking ring formed on the left fixing edge 266a of the left jaw line part 266.

Further, when the airbag 260 is stored, the discharge pipe 254a of the inflator 254 is inserted into the inlet 261c of the occipital part 261 and then fixed by a fixing means. As shown in FIG. 3, the fixing means may include a clamp 257 that tightens the outer surface of the inlet 261c and secures it to the discharge pipe 254a while the discharge pipe 254a is inserted into the inlet 261c.

Figure 8:
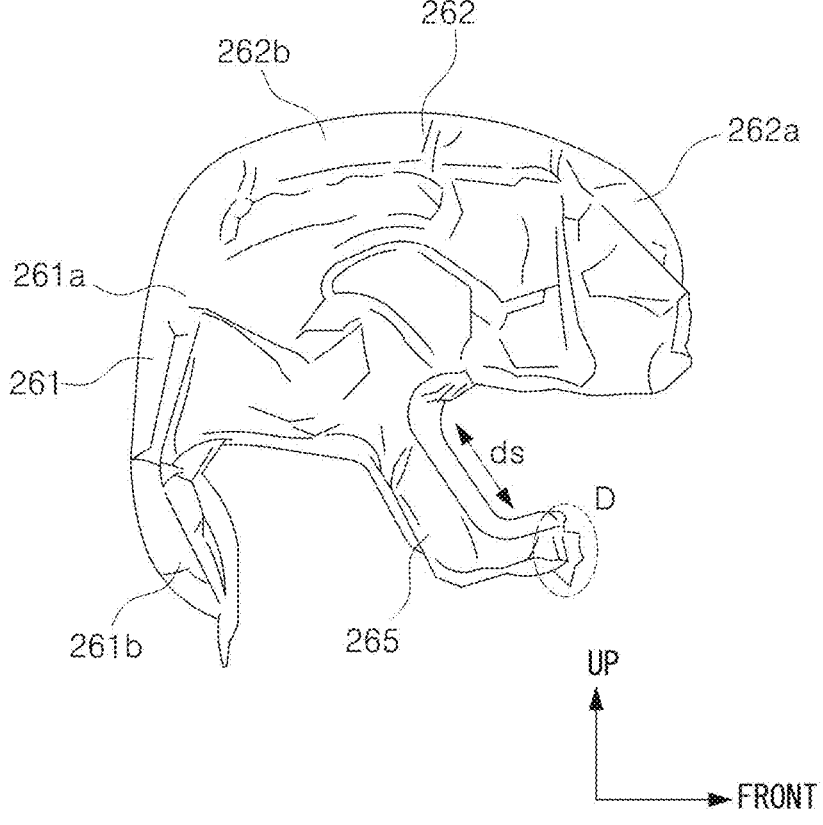
FIG. 8 illustrates an airbag inflated by injecting gas according to an embodiment of the present disclosure.

FIG. 8 illustrates an inflated state of the airbag 260. Based on the user's wearing state, the right side of FIG. 8 is the front side and the left side is the rear side.

By fastening the right fastening part 213 and the left fastening part 214, part D in FIG. 8 may be located under the user's chin. When the airbag 260 is inflated, the right jaw line part 265 and the left jaw line part 266 are inflated in the horizontal direction (direction perpendicular to the ground in FIG. 8), thereby shrinking in the longitudinal direction, that is, in the diagonal direction (ds) in FIG. 8. The airbag 260 may be brought into closer contact with the user's head due to the contracting action in the diagonal direction (ds) in a state that part D is fixed under the user's chin.

The airbag 260 according to the present embodiment has advantages that sewing is simple and the inflated areas do not overlap each other.

Figure 9:
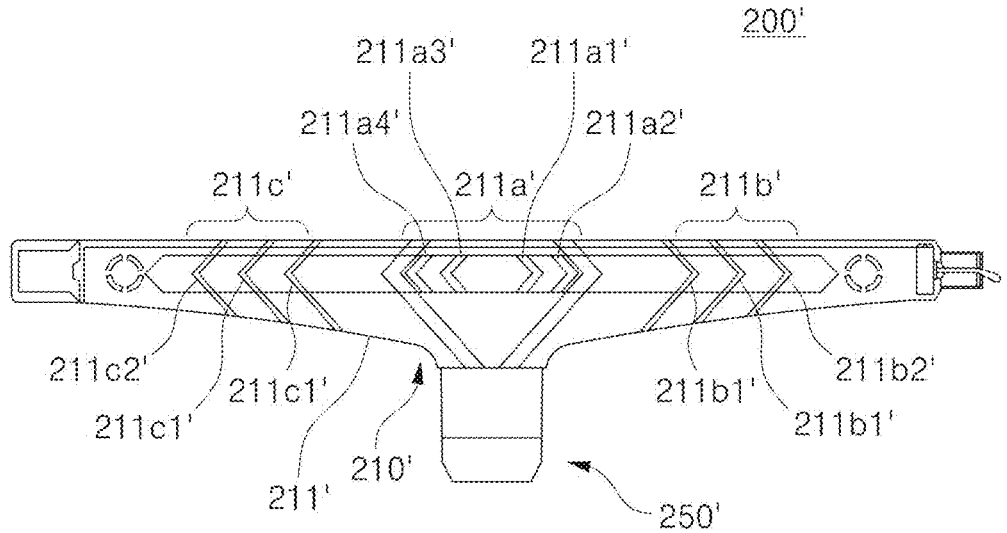
FIG. 9 illustrates a protection device according to another embodiment of the present disclosure.

Further, FIG. 9 shows another embodiment of the present disclosure, which will be described in detail below.

The main cover 211' of the airbag receiving case 210' according to the present embodiment includes a direction indication lighting unit for indicating the direction of travel on its rear side. To this end, a printed electroluminescent device using conductive polymer ink may be used, but the present embodiment is not necessarily limited to this example.

The direction indication lighting unit includes a central lighting unit 211a', a right lighting unit 211b', and a left lighting unit 211c'.

The right lighting unit 211b' includes a first right channel 211b1' and a second right channel 211b2' for direction indication. The first right channel 211b1' includes two direction signs, and the second right channel 211b2' includes one direction sign.

Additionally, the left lighting unit 211c' includes a first left channel 211c1' and a second left channel 211c2' for direction indication. The first left channel 211c1' includes two direction signs, and the second left channel 211c2' includes one direction sign.

The central lighting unit 211a' includes two central right channels 211a1' and 211a2' for right direction indication and two central left channels 211a3' and 211a4' for left direction indication.

When power is supplied to each of the above-mentioned channels, the corresponding direction indicators are illuminated and displayed.

The control circuit unit 253 of the inflator part 250 according to the present embodiment controls the direction indication lighting unit according to a signal from the storage kit 100 received through a wireless communication module.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

The invention claimed is:

1. A head protection device comprising:
an airbag receiving case configured to be flexibly bent around a user's neck, and including a first end and a second end configured to be releasably fastened to each other;
an airbag folded and stored in the airbag receiving case; and
an inflator part including a battery and configured to supply inflated gas to the airbag-,
wherein the airbag comprises:
an occipital part configured to protect a back part of a head of the user when inflated, the occipital part including an inlet through which the inflated gas is configured to flow into;
a front upper head part configured to protect a front part and an upper part of the head, the front upper head part extending from and being in communication with the occipital part, and the front upper head part including an upper right edge and an upper left edge;
a right part configured to protect a right area of the head, the right part extending from and being in communication with the occipital part, and the right part including a first right edge and a second right edge, which are both connected to the upper right edge; and
a left part configured to protect a left area of the head, the left part extending from and being in communication with the occipital part, and the left part including a first left edge connected to the upper left edge and a second left edge connected to the second right edge.

2. The head protection device of claim 1, wherein the occipital part includes an upper occipital part configured to correspond to the back part of the head, and a cervical part extending from the upper occipital part configured to protect a cervical spine of the user.

3. The head protection device of claim 1, wherein the front upper head part includes an upper head part extending from and being in communication with the occipital part, and the front upper head part includes a front part extending from and being in communication with the upper head part.

4. The head protection device of claim 3, wherein the right part includes a third right edge and the left part includes a third left edge, and
wherein the front part includes a front edge connected to both of the third right edge and the third left edge.

5. The head protection device of claim 1, wherein the airbag further comprises:
a right jaw line part extending diagonally from and in communication with the occipital part; and a left jaw line part extending diagonally from and in communication with the occipital part.

6. The head protection device of claim 5, wherein the right jaw line part includes a right fixing edge, and wherein the left jaw line part includes a left fixing edge.

7. The head protection device of claim 1, wherein the inflator part further comprises:

a housing connected to the airbag receiving case and configured to provide a storage space therein;

an inflator positioned within the housing and including a discharge pipe that is configured to discharge the gas into the airbag; and a control circuit unit configured to control operation of the inflator.

8. The head protection device of claim 7, wherein the housing comprises:

an outer housing including an upper outer housing connected to the airbag receiving case, and a lower outer housing detachably coupled to the upper outer housing; and an inner housing coupled to the upper outer housing or the lower outer housing, to accommodate the inflator, the control circuit unit, and the battery.

9. The head protection device of claim 7, further comprising a fixing means configured to tighten an outer surface of an inlet to be fixed at the discharge pipe while the discharge pipe is inserted into the inlet of the airbag.

10. The head protection device of claim 7, wherein the inflator part includes a light.

11. The head protection device of claim 7, wherein the inflator part further includes a wireless communication module, wherein the airbag receiving case includes a direction indication lighting unit configured to indicate direction of travel, and wherein the control circuit unit is configured to control the direction indication lighting unit according to a signal received through the wireless communication module.

12. A head protection device comprising:

an airbag receiving case configured to be flexibly bent around a user's neck, and including a first end and a second end configured to be releasably fastened to each other;

an airbag folded and stored in the airbag receiving case; and an inflator part including a battery and configured to supply inflated gas to the airbag, wherein the airbag receiving case includes a middle part which is connected to the inflator part, a right fastening part located at the first end of the airbag receiving case, and a left fastening part located at the second end of the airbag receiving case, the right fastening part and the left fastening part releasably fastened to each other.

13. The head protection device of claim 12, wherein the airbag receiving case comprises:

a main cover connected to the inflator part, the main cover being configured to provide a storage space to store the airbag in a folded state, wherein the main cover includes the right fastening part and the left fastening part; and a design cover detachably surrounding the main cover.

14. An airbag for head protection, the airbag comprising:

an occipital part configured to protect a back part of a head of a user when inflated, the occipital part including an inlet through which inflated gas is configured to flow into;

a front upper head part configured to protect a front part and an upper part of the head, the front upper head part extending from and being in communication with the occipital part, and the front upper part including an upper right edge and an upper left edge;

a right part configured to protect a right area of the head, the right part extending from and being in communication with the occipital part, and the right part including a first right edge and a second right edge, which are both connected to the upper right edge; and a left part configured to protect a left area of the head, the left part extending from and being in communication with the occipital part, and the left part including a first left edge connected to the upper left edge and a second left edge connected to the second right edge.

15. The airbag of claim 14, wherein the front upper head part includes an upper head part extending from and being in communication with the occipital part, and the front upper head part includes a front part extending from and being in communication with the upper head part.

16. The airbag of claim 15, wherein the right part includes a third right edge and the left part includes a third left edge, and wherein the front part includes a front edge connected to both of the third right edge and the third left edge.

17. The airbag of claim 14, further comprising:

a right jaw line part extending diagonally from and in communication with the occipital part; and a left jaw line part extending diagonally from and in communication with the occipital part.

18. The airbag of claim 17, wherein the right jaw line part includes a right fixing edge, and wherein the left jaw line part includes a left fixing edge.

* * * * *